March 27, 1934.  W. KOEHLER  1,952,850
METHOD AND APPARATUS FOR GALVANIC DEPOSITION OF COPPER AND OTHER METALS
Filed Oct. 6, 1931
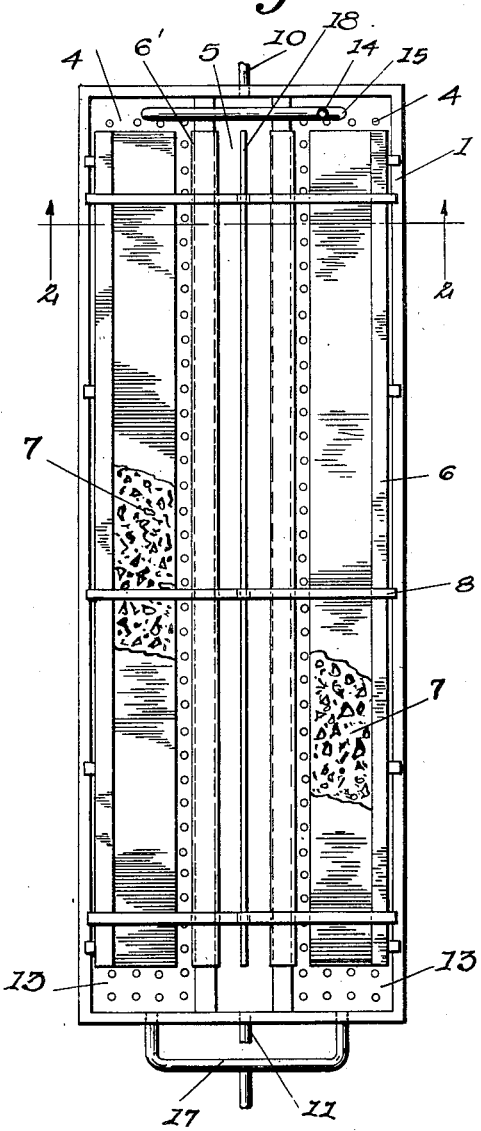
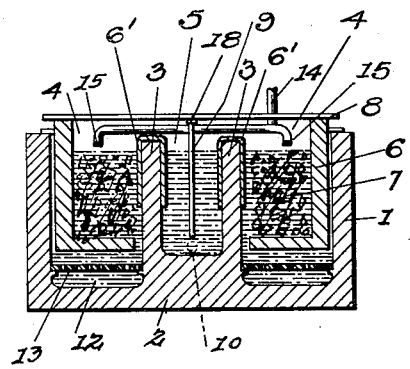
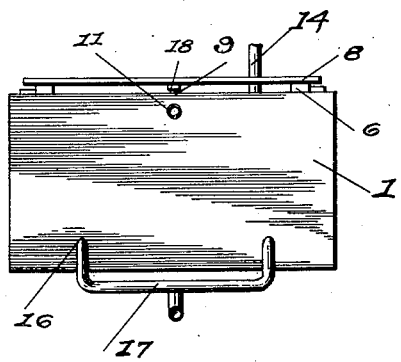
INVENTOR.
William Koehler
By Emery, Booth, Varney, Holcombe
HIS ATTORNEYS.

Patented Mar. 27, 1934

1,952,850

UNITED STATES PATENT OFFICE 1,952,850

METHOD AND APPARATUS FOR GALVANIC DEPOSITION OF COPPER AND OTHER METALS

William Koehler, Cleveland, Ohio

Application October 6, 1931, Serial No. 567,260

14 Claims. (Cl. 204—5)

My invention aims to provide an improved method and apparatus for galvanic cathode deposition of copper or other metals from mine waters, leaches, and other metal bearing solutions.

The only electro-chemical method for copper recovery now used commercially which does not require an extraneously applied electric current is the cementation process, whereby cement copper is precipitated as a result of bringing the copper bearing solution in intimate contact with scrap iron or other displacement metal. This cement copper is very impure, as a result of impurities carried by the scrap materials employed for the displacement, and must be refined. The refining process usually requires smelting and electrolytic treatment, thereby materially adding to the cost of the copper.

By my process I secure pure, reguline, electrolytic copper directly from copper bearing solutions such as chlorides and sulfates. This is done without utilizing any extraneously supplied power either in the form of electric current or heat.

I make use of the galvanic cell principle, by providing a compartment with scrap iron anode surrounded by a weak anolyte of the iron salt corresponding to the copper salt of the mine water and, separated from this by a semi-permeable diaphragm, I provide a cathode compartment in which copper is deposited from the mine water upon a copper or other suitable cathode. The anode and cathode are connected together externally by an electrical conductor, thus causing the negative charges given to the anode by the iron going into solution to pass over to the cathode and permit the continuous deposition of copper thereon by neutralizing the positive charges given up by the copper ions. It will thus be seen that the current flowing in the conductor is the result of the process and not the cause of it, as is the case in the ordinary electrolytic process where current for carrying on the precipitation is supplied to the cell from an external source.

I am aware that this general principle has been known for many years but it has never been commercially used because no cheap, effective way of carrying it out had ever been devised. Prior methods did not provide for, nor contemplate, continuous operation under constant conditions nor were the best conditions for securing a pure, reguline deposit known; and the result was that the deposit was not regular; the concentration of the anolyte steadily increased until excess iron ions migrated into the catholyte and were deposited as a contaminating film with the copper deposit; the ferrous anolyte was oxidized into ferric form, resulting in promoting the oscillation of oxidation and the reduction reactions and thereby entailing undue waste of the iron; crystallization was liable to set in and choke the action of the bath; and constant supervision was required.

These difficulties cannot arise in carrying out my method because I contemplate using practically neutral (as regards free acid) catholyte and anolyte solutions and I keep the anolyte weakly ferrous. I also continuously withdraw from the field of action the sludge and slime formed at the anode. I keep the governing factors constant all the time and so secure a pure, reguline copper deposit with a minimum consumption of iron. Further advantages will be brought out in the description.

In the accompanying drawing, wherein I have shown one embodiment of my invention for purposes of illustration, Fig. 1 shows a plan view of the entire galvanic cell arrangement;

Fig. 2 shows a vertical section on the line 22, Fig. 1;

Fig. 3 shows an end elevation of Fig. 1, looking in the same direction as in Fig. 2.

In the particular embodiment of my invention selected for illustration herein and shown in the drawing, referring to Figs. 1 and 2, I provide a vessel with walls 1 and bottom 2 of concrete which may be lined with asphaltic or other waterproofing material. This may be of any length of depth desired. It is divided by partition walls 3 into anode compartments 4 and central cathode compartment 5. The partitions may be made of any suitable diaphragm material, such as the treated cement form in the well known Griesheim cell, but for reasons of simplicity and low cost I prefer to construct these of regular concrete. Thus the whole cell may be constructed of concrete at one time. In order to provide for the necessary ion conductivity between anolyte and catholyte, I place blankets of capillary material 6' over and straddling each partition. Or, I may use siphons straddling the walls instead.

I provide L-shaped pendent brackets of iron 6 for the purposes of supporting the scrap iron anodes 7 (shown only in part in Fig. 1) and also for the purpose of affording better electrical connection with the bus bars of copper 8 which connect with the cathode 9. The support may be of a grate or grid form to facilitate the settling of the sludge. The cathode may be in sections which are suspended from and electrically connected by the bus-bar rod 18.

The fresh copper bearing solution is continuously introduced at the proper rate through the intake 10 into the bottom of cathode compartment 5 where it rises as it becomes depleted and finally passes out through the overflow pipe 11, shown in Fig. 3, in the upper part of the opposite end of the compartment.

Beneath the anode compartments proper 4 are settling chambers or troughs 12 running the full length of the compartments and separated therefrom by removable grids or by bottoms 13 which are provided with openings to permit the sludge and solution to enter. At the top of each anode compartment 4 is a water inlet pipe 14 provided with jets 15 for supplying fresh water at a constant rate to the anolyte. This water gradually sinks as it becomes more and more ferrous from the process, as does the sludge and slime produced at the anodes, and these pass into the settling chambers 12 and are continuously drawn off through openings 16 in outlet pipes 17, shown in Fig. 3.

It will thus be seen that not only are conditions of concentration of catholyte and anolyte kept constant at the most desirable points but that the influx and outgo of the solutions will keep the anolyte and catholyte at workable and economic temperatures and will cause a circulation therein and also keep the anolyte free from sludge and slime accumulations. The ferrous concentration of the anolyte is therefore automatically kept at the proper low value and both anolyte and catholyte are kept substantially neutral. It may be noted that the constant addition of water to the anolyte provides a top layer of pure water which largely prevents atmospheric oxdation in the bath and the production of ferric salts.

When a diaphragm is employed to separate anolyte and catholyte, the above described mode of circulating the respective solutions results in still further advantages in that maintaining both anolyte and catholyte less dense from bottom to top minimizes differentials of hydrostatic and osmotic pressure across the diaphragm at each point and thus minimizes migration of the solutions through the diaphragm, thus resulting in maintaining more uniform conditions and helping to prevent contamination of the cathode deposit.

In order to start the process going in the first instance, the water in the anode compartments must have sufficient ferrous salt (sulfate or chloride depending on the copper salt in the catholyte) added or else be made slightly acid, in order to permit the flow of the generated electric charges. Preferably, the anolyte concentration at the start should be made approximately equal to that desired during the process. The copper deposit is started on copper starting sheet cathodes. The deposit will be reguline and uniform on both sides of the cathode. When the desired thickness of deposit is obtained, the cathodes may be replaced with fresh starting sheets without stopping the process. Scrap iron is added from time to time to replenish the anode.

As before stated, the deposition cells may be of any length and any number may be used together, so that a large copper capacity can be obtained at small cost, as all the materials used are inexpensive. Practically no attention is required and unskilled labor can add the scrap iron and take out and replace the copper deposited cathode. The inflow and outflow of solutions, when once adjusted as to rate, will need little attention.

The outflow from the anode compartments, after filtration, consists of almost pure ferrous sulphate or chloride, as the case may be, and hence constitutes a by-product of value.

It will be seen that no acid is added to the catholyte and this expense is saved.

Owing to the conditions present in my improved process, less scrap iron is consumed per unit of copper than in the cementation process, and I secure pure, reguline, electrolytic copper directly at about the cost of producing the impure cement copper in the cementation process.

Precipitation of copper from copper sulphate by my method, on a laboratory scale, has shown a consumption of about 0.94 pounds of iron per pound of copper precipitated, the temperature of the bath being about 70° F.

My invention obviously is not restricted to the particular embodiment thereof herein illustrated and described.

It is obvious that the means disclosed for carrying out my invention with respect to copper bearing solutions can be easily adapted to the galvanic cathode deposition of all other metals and metalloids which are sufficiently electro-positive with respect to the anode metal used to produce an operative electro-motive force between cathode and anode. Thus with an iron anode the following may be deposited from their solutions: tin, lead, bismuth, antimony, silver, gold and the metals of the platinum group.

Having disclosed one illustrative embodiment of my invention, what I claim and desire to secure by Letters Patent is:

1. An improvement in the galvanic process of cathode deposition of metals substantially electro-positive with respect to iron from solutions containing them, comprising maintaining a ferrous anolyte in contact with a scrap iron anode, maintaining a catholyte of the solution to be treated in contact with a suitable cathode, maintaining the anolyte and catholyte separated from each other but in ionic transfer relationship, maintaining an electrical path between the anode and cathode and external to the anolyte and catholyte, continuously introducing fresh water upon the surface of the anolyte and withdrawing the enriched solution from the lower part, and continuously introducing fresh solution to be treated into the lower part of the catholyte and withdrawing the depleted solution from the upper part, whereby substantially constant operating conditions may be maintained and oxidation of the anolyte and migration of iron ions into the catholyte substantially prevented and a pure reguline deposit of metal secured with a minimum consumption of iron.

2. An improvement in the galvanic process of cathode deposition of copper from copper-bearing solutions, comprising maintaining a ferrous anolyte in contact with a scrap iron anode, maintaing a catholyte of copper-bearing solution in contact with a suitable cathode, maintaining anolyte and catholyte separated from each other but in ionic transfer relationship, maintaining an electrical path between anode and cathode and external to the anolyte and catholyte, continuously introducing fresh water upon the surface of the anolyte and withdrawing the enriched solution from the lower part, and continuously introducing fresh solution to be treated into the lower part of the catholyte and withdrawing the depleted solution from the upper part, whereby substantially constant operating conditions may be maintained and oxidation of the anolyte and migration of iron ions into the catholyte substantially prevented and a pure reguline deposit of copper secured with a minimum consumption of iron.

3. The process set forth in claim 2 in which the copper-bearing solution to be treated consists largely of copper sulphate and the anolyte of a weak solution of ferrous sulphate, and in which a copper cathode is used.

4. The process set forth in claim 2 in which the copper-bearing solution to be treated consists largely of copper chloride and the anolyte of a weak solution of ferrous chloride, and in which a copper cathode is used.

5. Apparatus for the galvanic deposition of metals from solutions, comprising in combination a cathode compartment, an anode compartment separated therefrom, means for conducting ions between them, means for supporting a scrap iron anode, means for continuously withdrawing solution and sludge from the bottom of the anode compartment and introducing fresh water above the liquid level thereof, means for continuously withdrawing solution from the top of the cathode compartment and introducing fresh solution into the bottom thereof, and an electrical conductor externally connecting the anode and cathode.

6. Apparatus as set forth in claim 5 in which the anode comprises an angle shaped iron bracket.

7. Apparatus as set forth in claim 5 in which the anode is comprised of an L-shaped iron pendent bracket sustaining means with scrap iron piled thereon facing the diaphragm.

8. Apparatus as set forth in claim 5, comprising in combination a settling chamber below the anolyte compartment and of substantially the same area, with means for withdrawing therefrom the iron solution and sludge.

9. Apparatus as set forth in claim 5, comprising in combination a substantially impervious separating wall between the anolyte and catholyte and means for conducting positive and negative ions between them.

10. Apparatus as set forth in claim 5, comprising in combination a substantially impervious separating wall between the anolyte and catholyte and capillary means straddling the said wall and connecting anolyte and catholyte.

11. Apparatus as set forth in claim 5, comprising in combination a substantially impervious separating wall between the anolyte and catholyte and siphon tubes straddling said wall and connecting anolyte and catholyte.

12. Apparatus for carrying out the galvanic process of cathode deposition of copper from copper-bearing solutions comprising in combination a central cathode compartment separated from side anode compartments by means of substantially impervious walls surmounted by means for conducting ions from one compartment to the other, a cathode of sheet copper, anodes formed of scrap iron piled on L-shaped iron pendent brackets and facing the cathode, settling chambers beneath the anode compartments with means for allowing solution and sludge therein to escape, inlet pipes with jet openings above the anode chambers, an overflow vent in the cathode compartment and an inlet pipe at the bottom thereof and an electrical conductor externally joining the anodes with the cathode.

13. Apparatus for carrying out the galvanic process of cathode deposition of copper from copper-bearing solutions comprising in combination a central cathode compartment separated from side anode compartments by means of substantially impervious walls surmounted by capillary blankets for conducting ions from one compartment to the other, a cathode of sheet copper, anodes formed of scrap iron piled on L-shaped iron pendent brackets and facing the cathode, settling chambers beneath the anode compartments with means for allowing solution and sludge therein to escape, inlet pipes with jet openings above the anode chambers, an overflow vent in the cathode compartment and an inlet pipe at the bottom thereof and an electrical conductor externally joining the anodes with the cathodes.

14. Apparatus for carrying out the galvanic process of cathode depositions of copper from copper-bearing solutions, comprising in combination a central cathode compartment separated from side anode compartments, means for conducting ions between the central and the side compartments, a cathode of sheet copper, anodes formed of scrap iron piled on L-shaped pendent brackets and facing the cathode, settling chambers beneath the anode compartments with means for allowing solution and sludge therein to escape, inlet pipes with jet openings above the anode compartments, an overflow vent in the cathode compartment and an inlet pipe at the bottom thereof, and an electrical conductor externally joining the anodes with the cathode.

WILLIAM KOEHLER.